United States Patent
Kiribuchi et al.

(10) Patent No.: US 10,063,168 B2
(45) Date of Patent: Aug. 28, 2018

(54) MOTOR CONTROLLER

(71) Applicant: OMRON Corporation, Kyoto-shi, Kyoto (JP)

(72) Inventors: Takeshi Kiribuchi, Osaka (JP); Ryuichi Jimbo, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/444,504

(22) Filed: Feb. 28, 2017

(65) Prior Publication Data
US 2017/0272013 A1  Sep. 21, 2017

(30) Foreign Application Priority Data

Mar. 15, 2016 (JP) ................................. 2016-051633
Feb. 21, 2017 (JP) ................................. 2017-030492

(51) Int. Cl.
H02P 6/24 (2006.01)
H02P 27/08 (2006.01)
H02P 29/024 (2016.01)
H02H 7/08 (2006.01)

(52) U.S. Cl.
CPC ............. *H02P 6/24* (2013.01); *H02H 7/0838* (2013.01); *H02H 7/0844* (2013.01); *H02P 27/08* (2013.01); *H02P 29/024* (2013.01)

(58) Field of Classification Search
CPC .......... H02P 6/24; H02P 27/08; H02P 29/024; H02H 7/0838; H02H 7/0844
USPC ....................................................... 318/478
See application file for complete search history.

(56) References Cited

U.S. PATENT DOCUMENTS

| | | | | |
|---|---|---|---|---|
| 7,834,579 B2* | 11/2010 | Nojima | ................. | H02M 7/487 318/254.2 |
| 9,154,059 B2* | 10/2015 | Sato | ........................ | H02M 1/36 |
| 9,887,659 B2* | 2/2018 | Jimbo | ................... | H02P 29/024 |
| 2008/0291588 A1* | 11/2008 | Kanai | ................. | H02H 7/0838 361/23 |

(Continued)

FOREIGN PATENT DOCUMENTS

JP   2008-295128 A   12/2008
JP   2010-104187 A   5/2010

(Continued)

OTHER PUBLICATIONS

Extended European search report dated Aug. 14, 2017 in the counterpart European patent application.

(Continued)

*Primary Examiner* — Kawing Chan
(74) *Attorney, Agent, or Firm* — Metrolexis Law Group, PLLC

(57) ABSTRACT

A motor controller includes an inverter configured to convert a direct current to an alternating current, a control unit that generates a PWM signal for driving the inverter in response to a motor drive command from an external device, and a safety circuit arranged between the inverter and the control unit. The inverter includes an upper switching element and a lower switching element. The safety circuit includes logic gates which are provided corresponding to the upper switching element and the lower switching element, respectively and each of which has two or more inputs to cut off the PWM signal based on a safety input signal.

4 Claims, 2 Drawing Sheets

(56) References Cited

U.S. PATENT DOCUMENTS

| | | | | |
|---|---|---|---|---|
| 2012/0213649 A1* | 8/2012 | Sumi | .................... | F04B 35/04 |
| | | | | 417/410.1 |
| 2013/0278191 A1* | 10/2013 | Zushi | .................... | H02H 7/122 |
| | | | | 318/400.22 |
| 2014/0092655 A1* | 4/2014 | Igarashi | ................ | B60L 3/003 |
| | | | | 363/56.03 |
| 2015/0145448 A1* | 5/2015 | Mukai | .................... | H02P 6/12 |
| | | | | 318/400.21 |

FOREIGN PATENT DOCUMENTS

| | | |
|---|---|---|
| JP | 2012-034462 A | 2/2012 |
| JP | 2012-034463 A | 2/2012 |
| JP | 2016-005289 A | 1/2016 |

OTHER PUBLICATIONS

The Japanese Office Action dated Sep. 26, 2017 in a counterpart Japanese patent application.

\* cited by examiner

MOTOR CONTROLLER

CROSS-REFERENCES TO RELATED APPLICATIONS

This application claims priority from prior Japanese Patent Application No. 2016-051633 filed Mar. 15, 2016 and Japanese Patent Application No. 2017-030492 filed Feb. 21, 2017, the entire contents of which are incorporated herein by reference.

FIELD

The disclosure relates to a motor controller.

BACKGROUND

A motor controller known in the art includes a safety circuit that stops a motor in a safe manner in response to, for example, an input from an emergency stop switch (Patent Literature 1). A motor controller described in Patent Literature 1 includes a safety circuit (a safety stop circuit) arranged between a pulse width modulation (PWM) circuit, which generates a PWM signal for driving a motor, and a drive circuit, which drives an inverter. The safety circuit includes a three-state buffer. The safety circuit uses an input from a motor stop switch as an input for controlling the three-state buffer to cut off a PWM signal that is input into the drive circuit.

PATENT LITERATURE

Patent Literature 1: Japanese Unexamined Patent Application Publication No. 2010-1041 87

SUMMARY

A motor controller uses a three-phase power supply line to supply power to a motor.

An inverter that receives an input of a PWM signal includes three pairs of switching elements corresponding respectively to the U phase, the V phase, and the W phase of the motor. More specifically, the inverter includes a series circuit for the U phase including a U-phase upper switching element and a U-phase lower switching element in a pair. The inverter also includes a series circuit for the V phase including a V-phase upper switching element and a V-phase lower switching element in a pair. The inverter further includes a series circuit for the W phase including a W-phase upper switching element and a W-phase lower switching element in a pair. The three series circuits are connected in parallel to a DC power supply. These three pairs of the upper switching elements and the lower switching elements are connected to their corresponding U-phase, V-phase, and W-phase armature windings respectively. When the safety circuit includes the three-state buffer as described in Patent Literature 1, an abnormal state of the three-state buffer can be detected. However, this structure cannot monitor the signal path included in the safety circuit.

An object of an embodiment of the invention is to provide a motor controller including a safety circuit that cuts off PWM signal s provided to an inverter and capable of appropriately determining a factor for an abnormality.

An aspect of the invention is a motor controller that includes an inverter, a control unit, and a safety stop circuit. The inverter converts a direct current to an alternating current. The control unit generates, in response to a motor drive command from an external device, a motor drive signal for driving the inverter. The safety stop circuit is arranged between the inverter and the control unit. The inverter includes an upper switching element and a lower switching element. The safety stop circuit includes logic gates which are provided corresponding to the upper switching element and the lower switching element respectively and each of which has two or more inputs to cut off the motor drive signal based on a safety input signal.

In one or more embodiments, the control unit receives at least one output signal from the logic gates having the two or more inputs or receives the safety input signal corresponding to the output signal, monitors the safety input signal or the output signal, and diagnoses a failure in the motor controller.

In one or more embodiments, the control unit receives at least one output signal from the logic gates having the two or more inputs, and receives the safety input signal corresponding to the output signal, and diagnoses a state of the logic gates having the two or more inputs based on the output signal and the safety input signal.

In one or more embodiments, the control unit inputs a self-diagnostic signal into an input terminal of each logic gate having the two or more inputs, and monitors a signal that is input into the input terminal to monitor a signal path for each logic gate having the two or more inputs.

In one or more embodiments, the safety stop circuit receives the motor drive signal and the safety input signal. When the safety input signal is set low, each logic gate having the two or more inputs outputs a low signal, and the safety stop circuit cuts off the motor drive signal.

According to the above aspect, the motor controller including the safety circuit that cuts off PWM signals to the inverter can appropriately determine a factor for an abnormality.

DETAILED DESCRIPTION

Figure 1:
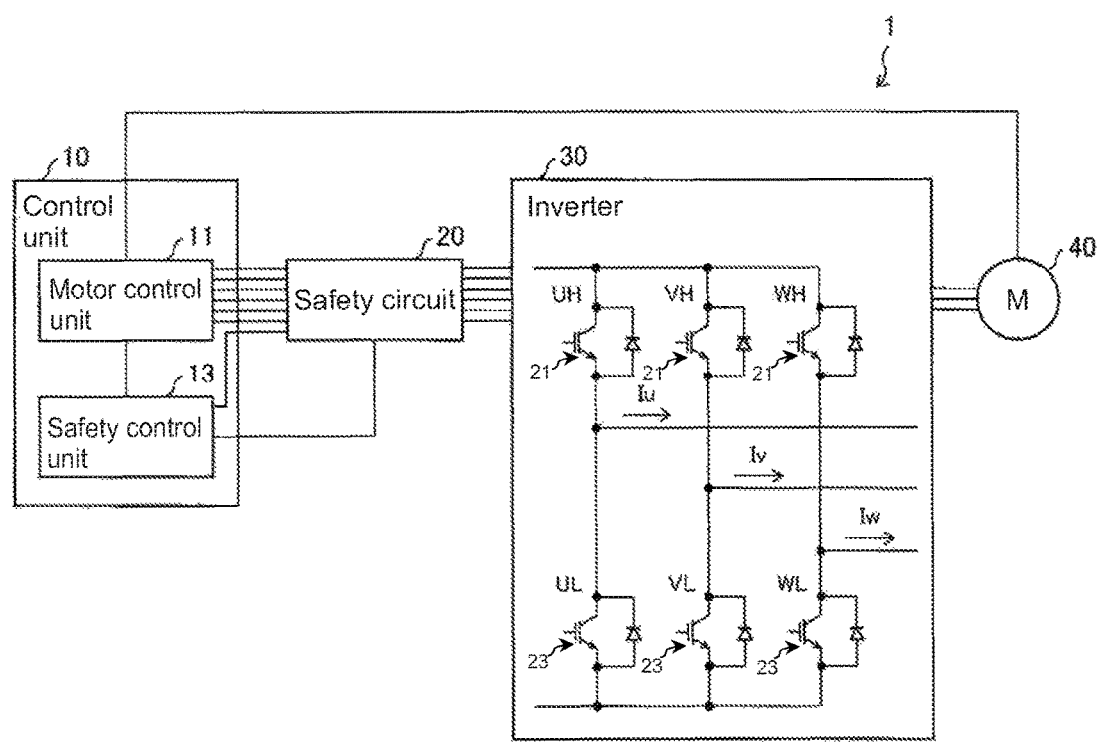
FIG. 1 is a diagram showing the configuration of a motor control system according to an embodiment of the present invention.

The configuration of a motor control system will now be described with reference to FIG. 1. A motor control system 100 includes a motor 40 and a motor controller 1. The motor controller 1 includes a control unit 10, a safety circuit 20 (or a safety stop circuit), and an inverter 30.

The control unit 10 includes a motor control unit 11 and a safety control unit 13. The control unit 10 may typically be a microprocessor that reads and executes a software module, or may combine a software module that is implemented by a microprocessor with a dedicated circuit. The control unit 10 may combine a plurality of software modules that are implemented by microprocessors.

The motor control unit 11 outputs pulse width modulation (PWM) signal (or a motor drive signal) for driving a motor 40 based on a command value (or motor drive command) from an external host device and a feedback value from a position sensor (not shown).

The inverter 30 includes three pairs of upper and lower switching elements corresponding respectively to the U phase, the V phase, and the W phase of the motor. Specifically, the pair for the U phase includes a U-phase upper switching element UH(21) and a U-phase lower switching element UL(23) connected in series. The pair for the V phase includes a V-phase upper switching element VH(21) and a V-phase lower switching element VL(23) connected in series. The pair for the W phase includes a W-phase upper switching element WH(21) and a V-phase lower switching element WL(23) connected in series. These three pairs are connected in parallel to an unillustrated DC power supply. U-phase, V-phase, and W-phase armature windings of motor 40 are connected between the upper switching element 21 and the lower switching element 23 of the corresponding U-phase, V-phase, and W-phase pairs, respectively. The inverter 30 switches the upper switching elements 21 and the lower switching elements 23 based on the PWM signals so as to drive the motor 40.

The safety circuit 20 receives the PWM signal output from the control unit 10 to the upper switching elements 21, the PWM signal output from the control unit 10 to the lower switching elements 23, and a safety input signal. When the safety input signal is set low, the safety circuit 20 cuts off the PWM signals to the upper switching elements 21 and the lower switching elements 23 in the inverter 30.

Figure 2A:
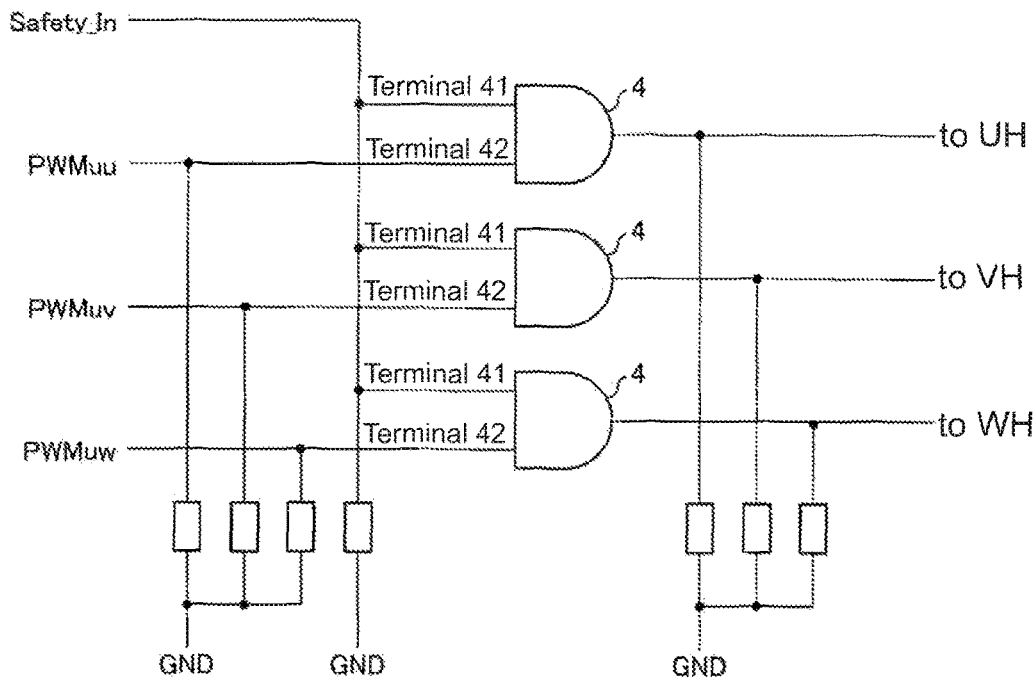
FIGS. 2A and 2B are diagrams showing the configuration of a safety circuit according to the embodiment of the present invention.
Figure 2B:
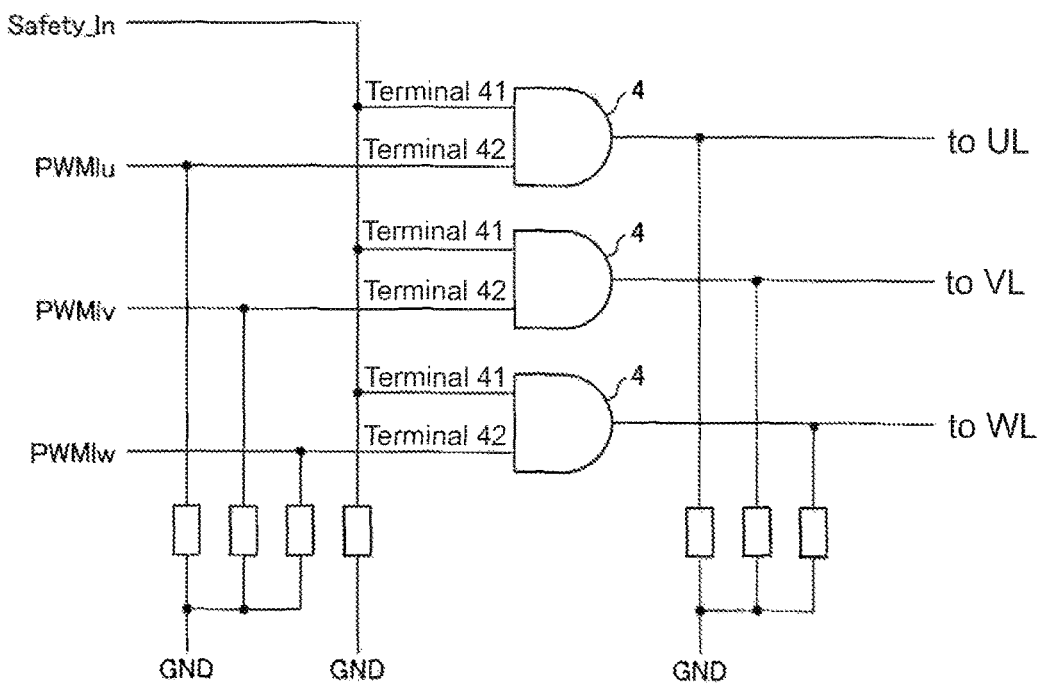

The operation of the safety circuit will now be described in detail with reference to FIGS. 2A and 2B.

The safety circuit 20 includes AND circuits having six N inputs in correspondence with the upper switching elements 21 and the lower switching elements 23. The safety circuit 20 receives a safety input signal from a safety controller (not shown) or a safety input signal from the safety control unit 13.

Each AND circuit 4 (AND gate) has input terminals 41 and 42. At the input terminal 41, each AND circuit 4 receives the safety input signal Safety_In. At the terminal 42, each AND circuit 4 receives the PWM signal.

When the safety input signal Safety_In is set high, the AND circuit 4 outputs the PWM signal. When the safety input signal Safety_In is set low, the output (output signal) from the AND circuit 4 becomes a low to cut off the output of the PWM signal.

As described above, the safety input signal is input into each AND circuit 4, which also receives the PWM signal corresponding to the upper switching element 21 or the lower switching element 23. This allows the PWM signal that is input into the upper switching element 21 or the lower switching element 23 to be cut off based on the safety input signal Safety_In.

The monitoring of an output from each AND circuit 4 will now be described. The output from each AND circuit 4 is input into the control unit 10. The safety input signal Safety_In input into the input terminal 41 of each AND circuit 4 is also input into the control unit 10. The control unit 10 monitors the output from each AND circuit 4 and the safety input signal for the corresponding upper 21 and lower switching element 23.

When the input safety input signal is set low, the control unit 10 determines that the safety circuit 20 is abnormal upon receiving an output other than 0 (Low) from any of the AND circuits 4.

When not all of the AND circuits 4 output PWM signals, that is, when at least one of the AND circuits 4 does not output a PWM signal, in the state where the input safety input signal indicates 1 (High), the control unit 10 determines that the safety circuit 20 is abnormal. When determining that the safety circuit 20 is abnormal, the control unit 10 stops outputting a PWM signal.

The control unit 10 monitors both the safety input signal Safety_In, which is returned as the logical AND for each of the upper and lower PWM signals, and the output from each AND circuit 4. With this, the control unit 10 can monitor the state of each AND circuit 4 and thus diagnose a failure in the motor controller 1. The control unit 10 may input a self-diagnostic signal to a signal line connecting to the input terminal 41 of each AND circuit 4, and may monitor the signal input into the input terminal 41 of each AND circuit 4 to monitor an abnormality on the signal path. The self-diagnostic signal may typically be a pulse signal with a predetermined fall time and a predetermined rise time.

The control unit 10 may monitor six AND circuits 4 and signal lines connecting to the AND circuits 4. Therefore, the control unit 10 can determines which AND circuits 4 or which signal lines have an abnormality.

Note that, in Patent Literature 1 (JP2010-104187A1), if an abnormality occurs in the three-state buffer, all of the PWM signals outputted from the three-state buffer become abnormal and this may cause the motor M to be in an abnormal state To the contrary, according to the embodiment of the present disclosure, the safety circuit 20 has an upper circuit corresponding to the upper switching elements 21 and a lower circuit corresponding to the lower switching elements 23, separately. Accordingly, even if an abnormality occurs in the upper circuit corresponding to the upper switching elements 21 and thus all of the upper PWM signals outputted therefrom become abnormal, the lower PWM signals outputted from the lower circuit corresponding to the lower switching elements 23 may be normal. That is, it is less likely that all the PWM signals outputted from the safety circuit 20 become abnormal which may cause the motor M to be in an abnormal state.

Further, the safety circuit 20 has six AND circuits 4 corresponding to three upper switching elements 21 and three lower switching elements 23. With this, even if an abnormality occurs in one of AND circuits 4 and the PWM signal outputted from the one thus becomes abnormal, the PWM signals outputted from the other AND circuits 4 may be normal. Therefore, it is even less likely that all of the PWM signals outputted from the safety circuit 20 become abnormal which may cause the motor M to be in an abnormal state.

In the above-described embodiment, three-phase motor 40 is used, but a two-phase motor may be used. In this case, the number of PWM signals may be four and the number of AND circuits 4 may be four. In the above-described embodiment, the PWM signal is used as a signal for driving the motor 40, but a signal for changing the current or the voltage to the motor 40 may be used.

Also, in the above-described embodiment, the AND circuit 4 is used, but another logic gate such as a NAND circuit or the like may be used. In this case, the phases of the safety input signal and the PWM signal may be determined to be appropriate based on the logic gates to be used. Further, in the above-described embodiment, two signals are input to each AND circuit 4, but three or more signals may be input to each AND circuit 4.

Further, a drive circuit for driving the upper switching elements 21 and the lower switching elements 23 of the inverter 30 based on the PWM signals from the safety circuit 20 may be provided between the safety circuit 20 and the inverter 30.

In another embodiment of the invention, a motor controller may comprise the following configuration. The motor controller according to another embodiment comprises a drive circuit configured to drive an inverter that converts a direct current to an alternating current; a control unit configured to generate, in response to a motor drive command from an external device, a motor drive signal for driving the drive circuit; and a safety stop circuit arranged between the drive circuit and the control unit. The drive circuit includes an upper switching element and a lower switching element. The safety stop circuit includes logic gates each having two or more inputs to cut off the motor drive signal based on a safety input signal, the logic gates provided corresponding to the upper switching element and the lower switching element, respectively.

The present invention is not limited to the above-described embodiments, but various modifications are possible within the scope indicated in the claims. Modifications obtained by appropriately combining configurations respectively disclosed in different embodiments are intended to be embraced in the scope of the present invention. Hence, all configurations including the meaning and range within equivalent arrangements of the claims are intended to be embraced in the invention.

REFERENCE SIGNS LIST 1 motor controller
4 AND circuit
10 control unit
11 motor control unit
13 safety control unit
20 safety circuit (safety stop circuit)
21 upper switching element
23 lower switching element
30 inverter
40 motor

The invention claimed is:
1. A motor controller, comprising:
an inverter;
a control unit; and
a safety stop circuit arranged between the inverter and the control unit, wherein:
  the inverter converts a direct current to an alternating current and comprises an upper switching element and a lower switching element;
  the control unit generates, in response to a motor drive command from an external device, a motor drive signal for driving the inverter;
  the safety stop circuit comprises at least one upper logic gate corresponding to the upper switching element and at least one lower logic gate corresponding to the lower switching element;
  each of the at least one upper logic gate and each of the at least one lower logic gate comprises two or more inputs, wherein one of the two or more inputs receives a safety input signal, and each of the at least one upper logic gate and each of the at least one lower logic gate are configured to cut off the motor drive signal based on the safety input signal; and
  the control unit:
    receives at least one output signal from each of the at least one upper logic gate, at least one output signal from each of the at least one lower logic gate, and the safety input signal, and
    diagnoses a state of each of the at least one upper logic gate and the at least one lower logic gate based on the respective output signals of each of the at least one upper logic gate and the at least one lower logic gate and the safety input signal.
2. The motor controller according to claim 1, wherein the control unit monitors the safety input signal or the respective at least one output signal from each of the at least one upper logic gate and each of the at least one lower logic gate, and diagnoses a failure in the motor controller based on the monitoring.
3. The motor controller according to claim 1, wherein the control unit inputs a self-diagnostic signal into an input terminal of each of the at least one upper logic gate and each of the at least one lower logic gate, and monitors a signal that is input into the input terminal to monitor a signal path for each of the at least one upper logic gate and each of the at least one lower logic gate.
4. The motor controller according to claim 1, wherein the safety stop circuit receives the motor drive signal and the safety input signal, and
when the safety input signal is set low, each of the at least one upper logic gate—and each of the at least one lower logic gate outputs a low signal, and the safety stop circuit cuts off the motor drive signal.

* * * * *